United States Patent
Choisel et al.

(10) Patent No.: US 10,109,292 B1
(45) Date of Patent: Oct. 23, 2018

(54) AUDIO SYSTEMS WITH ACTIVE FEEDBACK ACOUSTIC ECHO CANCELLATION

(71) Applicant: Apple Inc., Cupertino, CA (US)

(72) Inventors: Sylvain J. Choisel, Palo Alto, CA (US); Simon K. Porter, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/613,198

(22) Filed: Jun. 3, 2017

(51) Int. Cl.
| | |
|---|---|
| *H04B 3/20* | (2006.01) |
| *G10L 21/0232* | (2013.01) |
| *H04R 3/00* | (2006.01) |
| *H04R 9/06* | (2006.01) |
| *H04R 3/04* | (2006.01) |
| *H04R 29/00* | (2006.01) |
| *G10L 21/0208* | (2013.01) |
| *G10L 21/0216* | (2013.01) |

(52) U.S. Cl.
CPC .......... *G10L 21/0232* (2013.01); *H04R 3/005* (2013.01); *H04R 3/04* (2013.01); *H04R 9/06* (2013.01); *H04R 29/001* (2013.01); *G10L 2021/02082* (2013.01); *G10L 2021/02161* (2013.01)

(58) Field of Classification Search
CPC ....... G10L 21/0232; G10L 2021/02082; G10L 2021/02161; H04R 3/005; H04R 3/04; H04R 9/06; H04R 29/001
USPC ........ 381/57, 66, 92, 94.5, 94.7, 122; 379/3, 379/406.01, 406.02, 406.03, 406.05, 379/406.09, 406.12, 406.13, 406.14
See application file for complete search history.

(56) References Cited

U.S. PATENT DOCUMENTS

| 8,538,008 B2 | 9/2013 | Suppappola | |
|---|---|---|---|
| 9,053,697 B2* | 6/2015 | Park | G10K 11/1782 |
| 9,082,389 B2* | 7/2015 | Nicholson | G10K 11/1782 |
| 2005/0276423 A1* | 12/2005 | Aubauer | H04R 3/005 |
| | | | 381/92 |
| 2009/0010453 A1* | 1/2009 | Zurek | G10L 21/0208 |
| | | | 381/94.5 |
| 2009/0161900 A1* | 6/2009 | Enstad | H04R 1/342 |
| | | | 381/338 |

(Continued)

FOREIGN PATENT DOCUMENTS

WO    WO 2016186997 A1    11/2016

*Primary Examiner* — Vivian Chin
*Assistant Examiner* — Friedrich W Fahnert
(74) *Attorney, Agent, or Firm* — Ganz Pollard, LLC (57) ABSTRACT

An audio system includes an external microphone to receive a near-end audio content and a loudspeaker transducer and a corresponding enclosure defining an acoustic chamber. An internal pressure-gradient microphone is positioned in the acoustic chamber to detect a radiated output from the loudspeaker transducer. The audio system also includes a processor and a memory having instructions that, when executed by the processor, cause the audio system to receive a near-end signal from the external microphone and a reference signal from the internal microphone. The instructions, when executed, further cause the processor to cause the audio system to filter the reference signal from the near-end signal to define a clean near-end signal, and to emit the clean near-end signal. Related principles are described by way of reference to method and apparatus examples.

18 Claims, 5 Drawing Sheets

(56) References Cited

U.S. PATENT DOCUMENTS

| | | | |
|---|---|---|---|
| 2014/0341410 A1* | 11/2014 | Sim | H04R 1/028 |
| | | | 381/333 |
| 2014/0363008 A1 | 12/2014 | Chen et al. | |
| 2016/0150337 A1* | 5/2016 | Nandy | H04R 3/02 |
| | | | 381/66 |
| 2016/0352915 A1 | 12/2016 | Gautama | |
| 2017/0195790 A1* | 7/2017 | Choisel | H04R 3/04 |

* cited by examiner

FIG. 7

AUDIO SYSTEMS WITH ACTIVE FEEDBACK ACOUSTIC ECHO CANCELLATION

BACKGROUND

This application, and the innovations and related subject matter disclosed herein, (collectively referred to as the "disclosure") generally concern audio systems to remove echo from a near-end signal, and more particularly but not exclusively, to filter (as opposed to merely suppressing) non-linear components of echo. Some, but not all, disclosed principles can be embodied as an audio device having a loudspeaker transducer to render a far-end signal, an external microphone to receive a near-end audio content (e.g., speech), and an internal microphone positioned to receive an indication of the loudspeaker transducer's output, which may non-linearly correspond to the far-end signal. The audio device can also have an echo canceller to filter a signal (e.g., after appropriate delays) generated by the internal microphone from a signal generated by the external microphone to provide a cleaner representation of the near-end content relative to the unfiltered signal generated by the external microphone.

Conventional audio devices have a loudspeaker transducer and a microphone transducer. The loudspeaker transducer can emit sound corresponding to a far-end acoustic signal and the microphone transducer can emit an acoustic signal corresponding to near-end audio (acoustic waves) received by the microphone transducer.

The sound emitted by the loudspeaker can reverberate within a room or other environment surrounding the audio device. After a finite delay, the microphone can receive reverberations deriving from the sound emitted by the loudspeaker, which can impair an intended near-end audio. The reverberations are sometimes referred to in the art as "echo." An echo canceller can filter an estimate of the reverberation from the near-end audio signal observed by the microphone to provide a less-impaired near-end signal representative of the intended near-end audio.

Before reaching the loudspeaker transducer, the far-end acoustic signal can pass through a digital-to-analog converter (DAC) and the resulting analog signal can be amplified. Conventional acoustic echo cancellers (AEC) use the far-end acoustic signal taken just prior to the DAC, with appropriate gains and delays, as an estimate (reference) of the far-end signal to be filtered from the observed (e.g., impaired) near-end signal emitted by the microphone.

However, the sound emitted by the loudspeaker transducer usually has components that do not linearly correlate to the reference signal. For example, the DAC and amplification functions can introduce non-linear effects into the signal rendered by the loudspeaker transducer, e.g., an over-driven amplifier can introduce non-linear distortions. Further, a loudspeaker driver's force factor (i.e., a measure of a driver motor's electro-motive force applied to a loudspeaker diaphragm per unit of electrical current) can vary non-linearly over large diaphragm displacements, or excursions, as occurs when a loudspeaker transducer is driven under high amplification. As well, a restorative force applied to the diaphragm by a loudspeaker's suspension can vary non-linearly with displacement over large excursions. Consequently, a loudspeaker can introduce non-linear distortions under high amplification rates. And, mechanical vibrations induced in an enclosure for the audio device by output from the loudspeaker transducer can further impair the near-end signal observed by the microphone transducer. Other non-linearities also can arise.

Thus, even after a conventional AEC filters the estimated far-end signal from the observed near-end signal, non-linear components remain and require further signal processing to suppress the corresponding non-linear effects. However, such residual echo suppression can introduce further distortion into the near-end signal.

Accordingly, a need remains for an audio system capable of filtering linear and non-linear components of echo from a near-end signal.

SUMMARY

The innovations disclosed herein overcome many problems in the prior art and address one or more of the aforementioned or other needs. In some respects, the innovations disclosed herein generally concern audio systems and associated techniques to remove acoustic echo from a near-end signal. In other respects, disclosed innovations concern sensors suitable to detect loudspeaker emissions or another operating parameter indicative of such emissions.

Some, but not all, disclosed principles can be embodied as an audio device having a loudspeaker transducer to render a far-end signal, an external microphone to receive a near-end audio content (e.g., speech), and an internal microphone positioned to receive an indication of the loudspeaker transducer's output, which may non-linearly correspond to the far-end signal. The audio device can also have an echo canceller to filter a signal (e.g., after suitable delay) generated by the internal microphone from a signal generated by the external microphone to provide a cleaner representation of the near-end content.

The internal microphone can be a pressure-gradient microphone positioned in a rear acoustic chamber of the loudspeaker transducer to detect a radiated output from the loudspeaker transducer. The audio device can also include a processor and a memory containing instructions that, when executed by the processor, cause the audio system to receive a reference signal from the internal microphone and to receive a near-end signal from the external microphone. The instructions can further cause the audio device to filter the reference signal from the near-end signal to define a clean near-end signal, and to emit the clean near-end signal.

The pressure-gradient microphone can have a diaphragm separating opposed first and second chambers. A first port can acoustically couple the first chamber to an environment, e.g., the rear chamber of the transducer, and a second port can acoustically couple the second chamber to the environment. In some instances, an open area of the first port differs from an open area of the second port.

The internal microphone can be mounted to a printed circuit board. The first port, the second port, or both can be at least partially defined by one or more recesses in the printed circuit board.

The first port can include a plurality of discrete first ports. The open area of the first port can be defined by an aggregate open area of the first ports. The second port can include a plurality of discrete second ports. The open area of the second port can be defined by an aggregate open area of the second ports.

The internal pressure-gradient microphone can attenuate sound-pressure level by between about 45 dB and about 70 dB at frequencies below about 100 Hz, and between about 5 dB and about 30 dB at frequencies above about 1 kHz.

The loudspeaker transducer can have a movable diaphragm and the instructions, when executed by the processor, can further cause the audio system to determine a velocity of the diaphragm from an output of the internal microphone. The instructions, when executed by the processor, can further cause the audio system to determine the reference signal in part from the determined velocity of the diaphragm.

The reference signal can correspond to a selected frequency band. The instructions, when executed by the processor, can further cause the audio device to filter the reference signal from the near-end signal over the selected frequency band.

The reference signal can constitute a first reference signal. The instructions, when executed by the processor, can further cause the processor to receive a second reference signal corresponding to, e.g., another frequency band, and to filter the second reference signal from the near-end field over, e.g., the other frequency band. The second reference signal can be one or more of an audio signal containing an audio content to be rendered by the loudspeaker transducer, an output from a secondary voice coil, an output from a capacitive displacement sensor, and an output from a laser displacement sensor, as but several examples of sensors suitable to determine the loudspeaker diaphragm's displacement over time.

The external microphone can be a first external microphone and the near-end signal can be a first near-end signal corresponding to the first external microphone. The audio system can further have at least one other external microphone. The instructions, when executed by the processor, can further cause the audio system to receive a further near-end signal from each respective other external microphone and to filter the reference signal from each respective near-end signal. As above, the reference signal to be filtered from each respective near-end signal can be a first reference signal corresponding to a selected first frequency range. The audio system can receive a second reference signal, as above, corresponding to a second frequency range. The respective reference signals can be filtered from one or more of the near-end signals over each respective frequency range.

The loudspeaker transducer can be a first loudspeaker transducer, the acoustic chamber can a first acoustic chamber, and the internal pressure-gradient microphone can be a first internal pressure-gradient microphone. The audio system can further have at least one other loudspeaker transducer, a respective acoustic chamber corresponding to each at least one other loudspeaker transducer; and a corresponding internal pressure-gradient microphone positioned in each respective acoustic chamber corresponding to each at least one other loudspeaker transducer. The instructions, when executed by the processor, can further cause the audio system to receive a respective reference signal from each internal pressure-gradient microphone and to filter each respective reference signal, or a combination thereof, from the near-end signal. For example, such a combination can be a centrally tending combination, such as for example, a median or an average.

Sound can be radiated from a loudspeaker transducer having an enclosure defining an acoustic chamber. A near-end signal containing an intended near-end content and an impairment content corresponding to the sound radiated by the loudspeaker transducer can be received from an external microphone. A reference signal can be received from an internal pressure-gradient microphone positioned in the acoustic chamber to detect a radiated output from the loudspeaker transducer. The reference signal can be filtered from the near-end signal to define a clean near-end signal. The clean near-end signal can be emitted by the audio device, as down a wire to a far-end device.

The loudspeaker can have a movable diaphragm and the reference signal can be used to determine a velocity of the movable diaphragm. The reference signal can be a first reference signal, and a second reference signal can be received. The reference signal to be fileted from the near-end signal can include a combination of the first and the second reference signals. The combination can be a centrally tending combination, or a stitched-together combination of reference signals corresponding to each of a plurality of frequency bands.

Also disclosed are associated methods, as well as tangible, non-transitory computer-readable media including computer executable instructions that, when executed, cause a computing environment to implement one or more methods disclosed herein. Digital signal processors embodied in software, firmware, or hardware are suitable for implementing such instructions are also disclosed.

The foregoing and other features and advantages will become more apparent from the following detailed description, which proceeds with reference to the accompanying drawings.

BRIEF DESCRIPTION OF THE DRAWINGS

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation.

DETAILED DESCRIPTION

The following describes various innovative principles related to systems to remove (i.e., rather than to suppress) echo from a near-end signal, including non-linear components of echo. For example, certain aspects of disclosed principles pertain to an audio device having a loudspeaker transducer in an enclosure, or cabinet, defining a rear chamber, and a microphone transducer tailored to high levels of sound pressure positioned in the rear chamber to detect loudspeaker excursions and to provide a reference signal representative of the loudspeaker's radiated sound to an acoustic echo canceller (AEC). Such an AEC can filter the reference signal from an observed near-end signal (after appropriate gains and delays) to remove echo from the observed near-end signal. Embodiments of such systems described in context of specific apparatus configurations and combinations of method acts are but particular examples of contemplated systems chosen as being convenient illustrative examples of disclosed principles. One or more of the disclosed principles can be incorporated in various other audio systems to achieve any of a variety of corresponding system characteristics.

Thus, systems having attributes that are different from those specific examples discussed herein can embody one or more presently disclosed innovative principles, and can be used in applications not described herein in detail. Accordingly, such alternative embodiments also fall within the scope of this disclosure.

I. Overview

Figure 1:
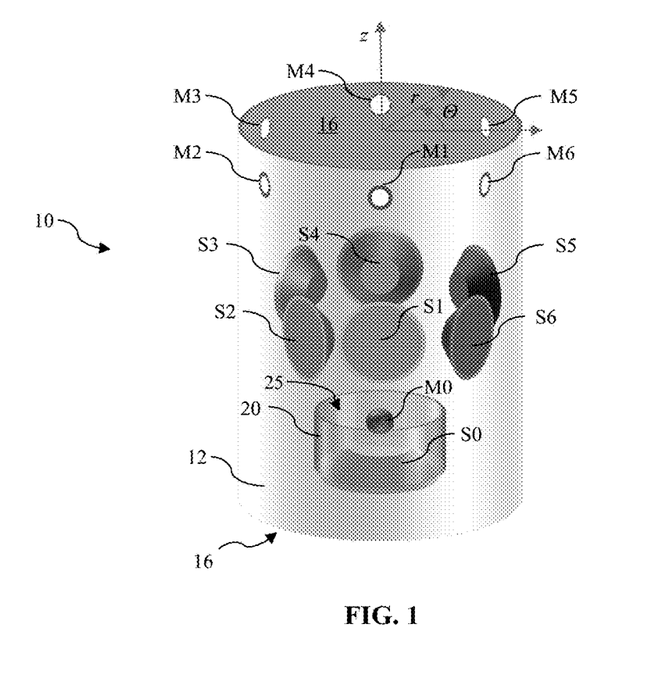
FIG. 1 illustrates an embodiment of an audio device.

Referring now to FIG. 1, an audio device 10 can have one or more loudspeaker transducers, e.g., loudspeakers S0 . . . S6, and one or more microphone transducers, e.g., microphones M0 . . . M6. Each microphone transducer can convert acoustic waves received by the respective microphone transducer into a near-end audio signal. Each loudspeaker transducer can convert an electrical signal into radiated acoustic waves (sound), as by driving a diaphragm in a pistonic or other motion.

Acoustic waves (sound) received by one or more of the microphone transducers can be influenced (or impaired) by acoustic waves radiated by one or more of the loudspeaker transducers, giving rise to so-called echo in the near-end audio signal. The acoustic echo canceller (AEC) 30 shown in FIG. 2 can remove some or all of the echo 21 from the near-end audio signal.

Figure 2:
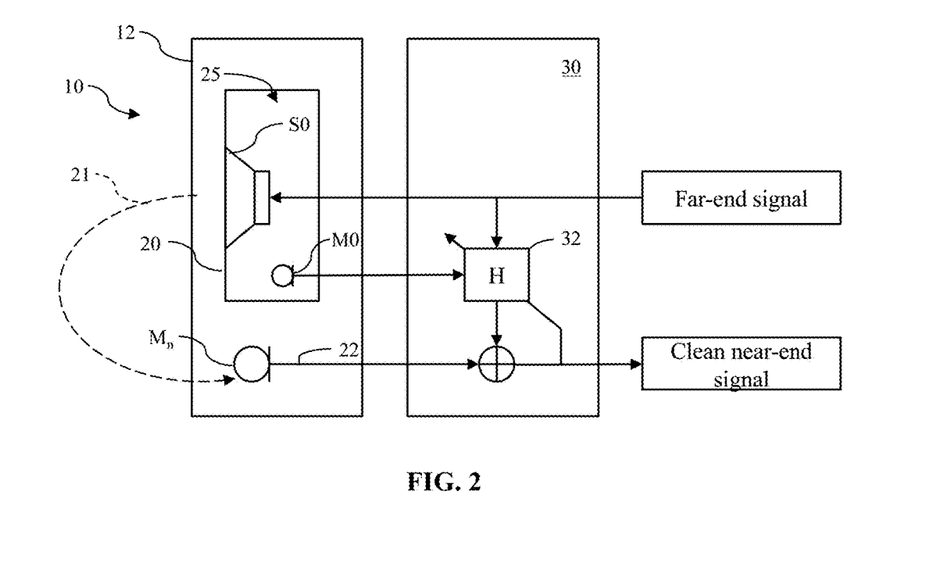
FIG. 2 illustrates a schematic block diagram of an acoustic-echo cancellation (AEC) processor for an audio device as shown in FIG. 1.

As indicated in FIG. 2, a representative one of the loudspeaker transducers can receive a far-end acoustic signal and radiate acoustic waves corresponding to that far-end signal. Notably, the radiated sound can be distorted relative to the far-end signal received by the AEC 30, as described above. Consequently, the radiated sound often might not correspond linearly to the far-end signal received by the AEC 30, at least over one or more frequency bands.

To address that and/or other deficiencies, the AEC 30 can receive a signal from a sensor indicative of, for example, a motion of a diaphragm in the loudspeaker transducer S0 as the transducer radiates acoustic waves. The detected motion more linearly correlates to the acoustic waves actually emitted by the loudspeaker transducer S0 and received by the external microphone $M_n$ than the incoming far-end signal. As described above, the motion, e.g., pistonic motion, of the diaphragm can non-linearly correspond to the incoming far-end signal when driven through large displacements. Such system non-linearities introduced between the far-end signal received by the AEC 30 and the loudspeaker transducer S0 can be captured by the displacement sensor. Consequently, filtering of the near-end signal emitted by the microphone $M_n$ with an output from the displacement sensor can remove relatively more echo, including system non-linearities, than filtering the observed signal with only the far-end signal received by the AEC 30. In the embodiment depicted in FIG. 2, the sensor that provides motion information is an internal microphone M0 positioned in a chamber 25 defined by a loudspeaker enclosure 20 (FIG. 1). Other types of displacement sensors are possible and described more fully below.

The computational block H can filter the signal emitted by the microphone M0 and/or the far-end signal received by the AEC (or components thereof, such as within selected frequency bands) from the near-end acoustic signal 22 emitted by the external microphone $M_n$ (FIG. 2). The filtered near-end signal, referred to in FIG. 2 as a "clean near-end signal," can include substantially less echo than a near-end signal filtered using only the incoming far-end signal received by the AEC 30, as the microphone M0 includes non-linearities introduced by the audio device 10 that are lacking from the far-end signal received by the AEC 30. The external microphone $M_n$ in FIG. 2 is representative of any of the external microphones M1 . . . M6 shown in FIG. 1, or any other external microphones provided in other embodiments described herein.

As explained more fully below, the microphone M0 can be suited for placement in the chamber 25 and use in high sound pressure level environments, as exist in the rear chamber. For example, the microphone M0 can be relatively insensitive over one or more frequency bands to avoid or reduce a likelihood of clipping when the loudspeaker S0 is driven through large excursions. In certain working embodiments of the type schematically shown in FIG. 3, the microphone M0 is configured as a pressure-differential or a pressure-gradient microphone similar to a bi-directional microphone having opposed chambers 41, 43 separated from each other by a diaphragm 45. However, unlike a bi-directional microphone, one chamber 41 of the pressure-gradient microphone M0 is ported to a surrounding environment 25 differently than the other chamber 43. Thus, as a pressure field within the chamber 25 varies with movement of the loudspeaker driver, the different porting of the chambers 41, 43 introduces a modest pressure gradient, a least over certain frequency bands, between the opposed chambers to drive the diaphragm 45. Movement of the microphone diaphragm 45, and the corresponding electrical signal emitted by the microphone transducer M0, can thus accurately represent movement or velocity of the loudspeaker diaphragm, and the corresponding acoustic waves radiated by the loudspeaker transducer.

Further details of disclosed principles are set forth below. Section II describes principles related to innovative audio devices by way of reference to the device 10 depicted in FIG. 1. Section III describes principles pertaining to acoustic echo cancellers and other audio processors, and Section IV describes principles related to sensors to detect motion of a loudspeaker diaphragm. And, Section V discloses principles related to computing environments suitable for implementing disclosed processing methods.

Other, related principles also are disclosed. For example, the following describes machine-readable media containing instructions that, when executed, cause a processor of, e.g., a computing environment, to perform one or more disclosed methods. Such instructions can be embedded in software, firmware, or hardware. In addition, disclosed methods and techniques can be carried out in a variety of forms of signal processor, again, in software, firmware, or hardware.

II. Audio Devices

FIG. 1 shows an audio device 10 that includes a loudspeaker cabinet 12 having integrated therein a loudspeaker array including a plurality of individual loudspeaker transducers $S_1, S_2, \ldots, S_6$ and a microphone array including a plurality of individual microphones $M_1, M_2, \ldots, M_6$. Each of the microphones $M_1, M_2, \ldots, M_6$ in the microphone array is arranged to measure an acoustic pressure externally of the audio device 10.

In FIG. 1, the cabinet 12 has a generally cylindrical shape defining a central, longitudinal axis z arranged perpendicularly to the opposed ends 16 of the cylindrical cabinet. The microphones $M_1, M_2, \ldots, M_6$ in the microphone array are distributed evenly around the central, longitudinal axis at a constant, or a substantially constant, radial distance from the axis. The microphones $M_1, M_2, \ldots, M_6$ in the microphone array are circumferentially spaced apart from each other. In the illustrated embodiment, each of the microphones $M_1, M_2, \ldots, M_6$ is circumferentially spaced from the immediately adjacent microphone by 60 degrees. Of course, other embodiments can space the microphones more or less (e.g., in correspondence to the number of microphones in the array being less or more than six). As well, some microphone arrays do not have equally spaced apart microphone transducers, such that some microphones are closer together than other microphones.

In still other embodiments, the arrangement and number of microphones can vary. For instance, instead of the microphone array extending around a circumference of the cabinet 10, microphones in another microphone array can be aligned in one or more rows, as in the style of a sound bar. Any one or more of the microphones disclosed herein may be considered an acoustic-to-electric transducer and include a diaphragm and circuitry configured to produce an audio signal in response to a sound input.

Each loudspeaker transducer $S_0, S_1, \ldots, S_6$ may be an electrodynamic or other type of driver that may be specially designed for sound output at particular frequency bands, such as a subwoofer, tweeter, or midrange driver, for example. Each of the loudspeaker transducers $S_1, S_2, \ldots S_6$ in the loudspeaker array may be arranged side-by-side and circumferentially distributed around the central longitudinal axis of the cabinet 10. In the illustrated embodiment, the loudspeaker transducers $S_1, S_2, \ldots, S_6$ in the loudspeaker array are distributed evenly around the longitudinal axis at a constant, or a substantially constant, radial distance from the axis, and are circumferentially spaced from each other by about 60 degrees.

Other arrangements for the loudspeaker and microphone transducers are possible. For instance, the loudspeaker or microphone transducers in each respective array may be distributed evenly (e.g., around the longitudinal axis separated from adjacent microphones by a constant angle, $\Theta$, or at least one loudspeaker transducer for each outwardly facing surface of a cabinet shaped as a rectangular prism) within the loudspeaker cabinet 10, or unevenly. As well, the loudspeaker transducers $S_1, S_2, \ldots, S_6$ and/or the microphone transducers $M_1, M_2, \ldots, M_6$ can be positioned at various selected longitudinal positions measured along the longitudinal axis, rather than at one longitudinal position as shown in FIG. 2. In some embodiments, the audio device 10 has but one individual loudspeaker transducer and/or but one individual microphone transducer.

Also shown in FIG. 1 is an enclosure, or housing, 20 defining an enclosed rear chamber 25 for a selected loudspeaker transducer S0. The loudspeaker transducer S0 is in a "sealed" enclosure 20 that creates a back volume 25 (rear chamber) around a backside of a diaphragm of the transducer. The back volume 25 is the volume inside the enclosure 20. "Sealed" indicates acoustically sealed in that the back volume does not transfer sound waves produced by the back side of the diaphragm to the outside of the enclosure 20 or to the outside of the loudspeaker cabinet, at the frequencies at which the transducer operates, in order to reduce a possibility of the front sound waves interfering with the back sound waves. There may be a front volume chamber formed around a front side of the diaphragm of the transducer S0 through which the front sound waves exit the loudspeaker cabinet. In one embodiment, the enclosure 20 may have dimensions that are smaller than the wavelengths produced by the transducer. The enclosure 20 may be a smaller volume confined inside the loudspeaker cabinet 12, or it could be "open" to the full extent of the available internal volume of the loudspeaker cabinet 12.

Mounted within the rear chamber 25 is an internal microphone, sometimes referred to as a "reference microphone," M0. In general, the internal microphone M0 can be configured as any type of microphone suitable for operating in an enclosed chamber of the loudspeaker transducer S0. In some instances, however, a conventional, e.g., unidirectional, microphone may have an insufficient range to accommodate large changes in pressure arising from large and/or rapid excursions of a diaphragm or other air mover of the loudspeaker transducer S0. Consequently, such a conventional microphone can "clip" or otherwise not fully respond over the full range of loudspeaker excursion.

In some embodiments, a differential-pressure-gradient microphone (e.g., depicted in FIG. 3) can be used in the rear chamber 17 and can be tuned to be relatively insensitive over a selected range of frequencies over which the loudspeaker transducer $S_0$ operates, as described more fully below. The internal microphone M0 may, in one embodiment, be any type of microphone (e.g., a differential pressure gradient micro-electro-mechanical system (MEMS) microphone) that will be used to indirectly measure volume velocity (volumetric flow rate) produced by the moving diaphragm of the transducer S0, displacement and/or acceleration of the moving diaphragm, during playback of an audio signal. An output of the microphone can be filtered from the observed near-end signal 22 (FIG. 2).

Although the loudspeaker cabinet 10 is shown as being cylindrical, other embodiments of a loudspeaker cabinet 10 have another shape. For example, some loudspeaker cabinets can be arranged as, e.g., a triangular, rectangular, pentagonal, or other general prismatic structure, a tetrahedral structure, a spherical structure, an ellipsoidal structure, a toroidal structure, or as any other desired three-dimensional shape. As well, the loudspeaker transducers can be positioned in arrangements other than being distributed about the enclosure. For example, the loudspeaker transducers can be arranged in one or more rows, as in the style of a sound bar.

III. Acoustic Echo Cancellation

The AEC 30 shown in FIG. 2 receives a far-end acoustic signal and an acoustic signal from a sensor, e.g., internal microphone M0. The AEC 30 filters one or both of the far-end acoustic signal and the sensor signal, or selected combination thereof, after appropriate delays, from the near-end acoustic signal 22 emitted by the respective external microphone $M_n$ to remove, e.g., certain linear and non-linear echo 21 that can arise from, for example, an over driven amplifier, loudspeaker distortions arising when driven through large displacements enclosure vibrations, and/or other system non-linearities.

The loudspeaker transducer S0 can emit sound corresponding to a far-end acoustic signal. The far-end acoustic signal can pass through a digital-to-analog converter (DAC) and the resulting analog signal can be amplified before reaching the loudspeaker transducer.

Sound emitted by a loudspeaker, e.g., loudspeaker S0, can reverberate within a room or other environment surrounding the audio device 10. After a finite delay, the microphone $M_n$ can receive an intended near-end audio, impaired by the reverberation, or echo, 21. An echo cancellation processor 30 can filter an estimate of the reverberation 21 from the observed near-end audio signal 22 to provide a less-impaired near-end signal representative of the intended near-end audio.

The AEC 30 can use the far-end acoustic signal taken just prior to the DAC, with appropriate delays, as an estimate (reference) of the far-end signal to be filtered from the observed (e.g., impaired) 22 near-end signal. However, the sound emitted by the loudspeaker S0 can have components that do no linearly correlate to that reference signal. Accordingly, the AEC 30 can alternatively or additionally receive digital information from the internal microphone M0 as an alternative or an additional reference signal to estimate a sound radiated by the loudspeaker S0. The AEC 30 can use either or both reference signals for filtering the near-end signal 22 in a desired manner.

The AEC processor 30 may be a special purpose processor such as an application specific integrated circuit (ASIC), a general purpose microprocessor, a field-programmable gate array (FPGA), a digital signal controller, or a set of hardware logic structures (e.g., filters, arithmetic logic units, and dedicated state machines), and can be implemented in a general computing environment as described herein.

The AEC processor 30 is to receive an input audio channel of a a far-end signal, as from a media device or, in context of telephony, another speaker. The far-end signal may constitute a digital input or an analog input.

The far-end signal may emanate from a programmed processor that is running a media player application program and may include a decoder that produces the far-end signal input to the AEC processor. To do so, the decoder may be capable of decoding an encoded audio signal, which has been encoded using any suitable audio codec, e.g., Advanced Audio Coding (AAC), MPEG Audio Layer II, MPEG Audio Layer III, and Free Lossless Audio Codec (FLAC). Alternatively, the audio device 10 may include a codec to convert an analog or optical audio signal, from a line input (not shown), for example, into digital form for the AEC. Alternatively, there may be more than one input audio channel, such as a two-channel input, namely left and right channels of a stereophonic recording of a musical work, or there may be more than two input audio channels, such as for example the entire audio soundtrack in 5.1-surround format of a motion picture film or movie. Other audio formats also are contemplated. Other particular examples are 7.1 and 9.1-surround formats.

The adaptive filter process block H can receive a reference signal, e.g., the output signal from the internal microphone M0 and/or the far-end signal, as well as a respective microphone output signal from a corresponding external microphone M1, M2, . . . M6 to be filtered. The filter process block H can compute an estimate of an impulse response of an acoustic system having an input from the far-end signal and/or the reference microphone M0, and an output 22 at the external microphone that corresponds to (or is associated with) that adaptive filter process block H. As each external microphone will sense sound differently despite for example being replicates of each other (e.g., at least due to each being in a different position relative to the transducer S0 and/or relative to a nearby, acoustically reflective surface), the estimated impulse responses can vary among the microphone transducers M1, M2, . . . M6.

The AEC processor 30 can output a "clean" near-end signal after filtering each of one or more reference signals from the observed near-end signal 22.

IV. Diaphragm Excursion Sensors

As noted above, a sensor to detect or infer movement of a loudspeaker diaphragm can provide an input to the AEC 30. In some embodiments, the sensor can be any of a secondary voice coil, a capacitive displacement sensor, a laser displacement sensor, and/or a microphone.

For example, a pressure-differential or a pressure-gradient microphone can be positioned in the rear chamber 25 of a loudspeaker enclosure 20. The microphone M0 can define a pair of opposed chambers 41, 43 separated from each other by a membrane 45. Each chamber 41, 43 can have a corresponding port 42, 44 open to a local microphone environment (e.g., the rear chamber 25 of the loudspeaker). The ports 42, 44 can be differently sized relative to each other. Thereby, the microphone membrane 45 can respond to a differential in pressure (e.g., a pressure gradient) between the port(s) of one chamber relative to the port(s) of the other chamber, but not to a change in absolute pressure of the local environment 35. As but one example, such a microphone can attenuate at least 10 dB relative to a microphone having a single sealed chamber behind a membrane.

With a pressure-differential microphone as just described, large excursions of the loudspeaker's diaphragm can avoid microphone clipping, and yet the microphone M0 can still be used to indirectly measure a volume velocity (or a volumetric flow rate) produced by the moving diaphragm of the transducer S0, a displacement of the moving diaphragm, and/or acceleration of the moving diaphragm, during playback of an audio signal. In some embodiments, a micro-electro-mechanical system (MEMS) microphone can be configured as a differential-pressure-gradient microphone as just described, and used in the rear chamber 25.

Figure 3:
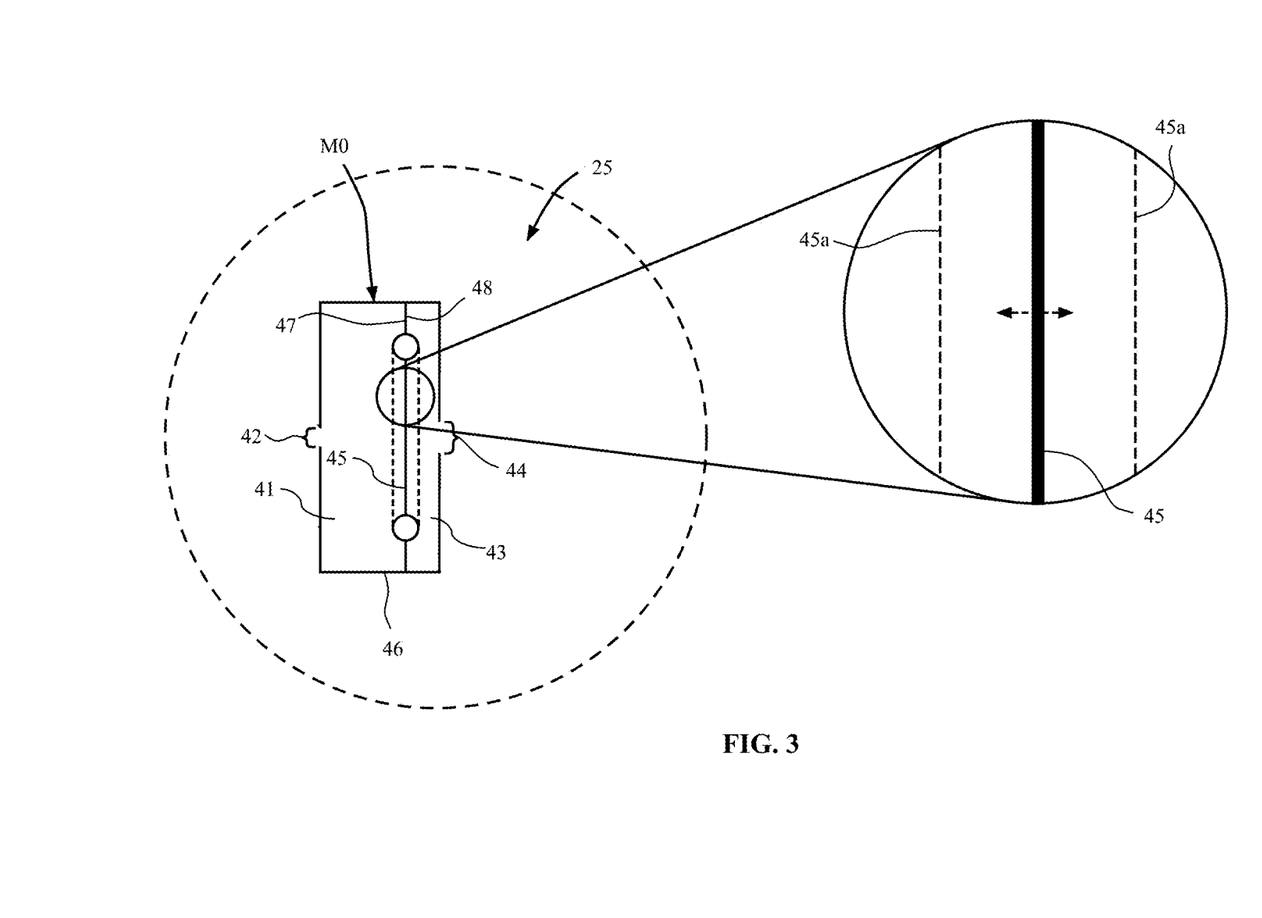
FIG. 3 schematically illustrates a pressure-differential microphone to provide a reference signal for the AEC processor in FIG. 2.
Figure 4:
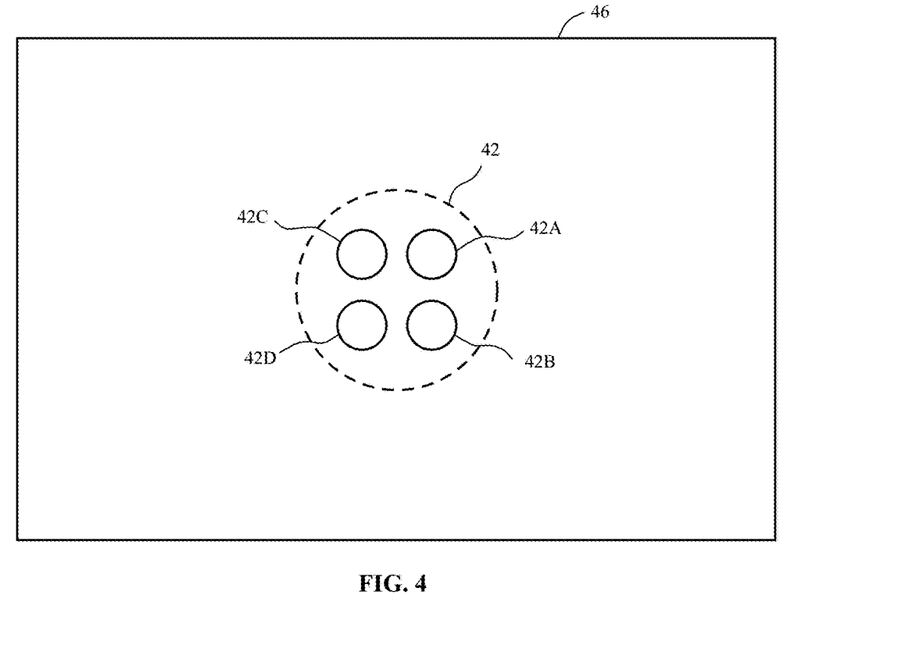
FIG. 4 illustrates an example of a port configuration for a pressure differential microphone as shown in FIG. 3.

In FIG. 3, the internal microphone is a differential pressure gradient microphone M0 having a reduced sensitivity so that it is operable to measure an acoustic characteristic of a loudspeaker. Microphone M0 may be, for example, a micro-electro-mechanical system (MEMS) microphone. It is contemplated, however, that microphone M0 could be any type of transducer operable to convert sound into an audio signal, for example, a piezoelectric microphone, a dynamic microphone or an electret microphone.

As previously discussed, microphone M0 is positioned within a back volume chamber 25 formed by a loudspeaker enclosure 20 sealed to the back side of the loudspeaker diaphragm. In other words, microphone M0 is positioned within, and designed to operate within, a chamber 25 having an assumed uniform pressure field in which any change in pressure is uniform throughout the chamber, as opposed to an ambient or other environment in which pressure change is variable. Microphone M0 may include a microphone housing or enclosure 46 (e.g., a MEMS microphone enclosure) that encloses the compliant membrane 45 (e.g., a microphone diaphragm) as well as any other microphone components necessary for operation of microphone (e.g., actuator, circuitry, etc.). The compliant membrane 45 may be positioned within the microphone enclosure 46 such that it divides microphone enclosure 46 into a first chamber 41 and a second chamber 42. The first chamber 41 may be acoustically coupled to a front side 47 (e.g., a first major surface) of compliant membrane 45 while second chamber 43 may be acoustically coupled to a back side 48 (e.g., a second major surface) of the compliant membrane 45. In other words, first chamber 41 defines an acoustic volume or cavity around the front side 47 and second chamber 43 defines an acoustic volume or cavity around the back side 48 of compliant membrane 45.

The first chamber 41 may include a primary acoustic port 42 formed through a wall of the enclosure 46 and which forms an acoustic pathway between the back volume chamber 35 of the loudspeaker and the front side 47 of the compliant membrane 45. The second chamber 43 may further include a secondary acoustic port 44 formed through a wall of enclosure 46 and which forms an acoustic pathway between the back volume chamber 25 of the loudspeaker and the back side 48 of the compliant membrane 45. The primary acoustic port 42 and the secondary acoustic port 44 can be tuned with respect to one another in order to cause a pressure gradient across compliant membrane 45 consistent with movement of the diaphragm of the loudspeaker S0, while controlling, or tuning, a sensitivity of microphone M0.

It should be understood that by providing tuned acoustic pathways to both the first chamber 41 and the second chamber 43 from the loudspeaker volume chamber 25, the difference in pressure between the front side 47 and the back side 48 of the compliant membrane 45 can be controlled. This in turn provides a mechanism for controlling a sensitivity of the microphone M0 so that it can be used to accurately estimate or otherwise measure, for example, a displacement, velocity and/or acceleration of a loudspeaker diaphragm.

By way of contrast, for example, an enclosure of a conventional omnidirectional may include a single port (e.g., a sound input port) acoustically coupled to a front side of a diaphragm (e.g., a sound pick up face of the diaphragm), while the back side of the diaphragm is sealed within the enclosure (e.g., a back volume chamber). As a result, the back side of the diaphragm is exposed to a substantially fixed "reference" air pressure, which may be much higher than a pressure on the front side of the diaphragm, thus creating a relatively large pressure difference between the front and back sides of the diaphragm and, in turn, a highly sensitive microphone. For example, such a conventional microphone may have a maximum operating level of less than 130 dB SPL (defined as the 10% THD point) and overload at levels greater than 130 dB SPL. Due to the sensitivity of such a microphone, it cannot accurately measure, for example, the displacement, velocity and/or acceleration of a loudspeaker diaphragm where sound pressure levels can exceed 130 dB (SPL).

The microphone M0 shown in FIG. 3 solves that problem by including a secondary port 44 to the second chamber 43 surrounding the back side 48 of compliant membrane 45. Moreover, the secondary port 44 can be acoustically tuned with respect to the primary port 42 so that a pressure difference between a front side 47 and a back side 48 of the compliant membrane 45 is controlled or modified to within a range suitable for operation of microphone M0 at levels than greater than 130 dB (SPL). For example, the ports can be tuned so that a pressure difference between the front side 47 and the back side 48 of compliant membrane 45 is reduced, thus reducing a sensitivity of microphone. It should be understood that when characteristics of microphone 304 are referred to herein as being "reduced", "reduces" or "reducing", the reduction in pressure difference is in comparison to a microphone having a sealed back volume chamber (e.g., an omnidirectional microphone without openings to both front and back volumes) and operating under similar conditions (e.g., within a sealed back volume chamber of a loudspeaker).

In one embodiment, the degree to which the sensitivity of microphone 304 can be reduced, or otherwise changed, is dictated by the sizes or open surface area of the primary port 42 and the secondary port 44 with respect to one another. For example, a ratio between an open surface area or size of the primary port 42 and that of the secondary port 44 can be such that a desired pressure difference between the front side 47 and the back side 48 of the compliant membrane 45 is achieved under a selected range of diaphragm excursions, and in turn, a desired level of sensitivity for the M0 can be achieved. Such a pressure difference in some embodiments is lower than the pressure difference achieved by a single ported microphone having a sealed back volume chamber so that the microphone is not too sensitive to operate at an increased SPL (e.g., greater than 130 SPL) before limiting, or clipping, at a selected degree of total harmonic distortion, e.g., 10% THD.

For example, the size, open surface area, acoustic impedance and/or acoustic resistance of the secondary port 44 can be different than that of the primary port 42. For example, in one embodiment, an acoustic impedance or acoustic resistance of the secondary port 44 is greater than that of the primary port 42. Referring to FIG. 3, a size or open surface area 44a of the secondary port 44 is less than a size or open surface area 42a of the primary port 42 (e.g., the primary port 42 is larger than the secondary port 44). In this aspect, for a given external pressure (e.g., pressure within the back-volume chamber 25 of the loudspeaker S0), the secondary port 44 creates a resistive pathway or vent to the back side 48 of compliant membrane 45 being more resistive than the primary port 42, but less resistive than a back chamber of a single-ported microphone. That arrangement lowers the compliant membrane excursion under a given acoustic load in the back chamber 25, allowing for exposure to increased SPL before clipping (e.g., as compared to a single ported microphone within the same environment). For example, as can be seen from the exploded view of compliant membrane 45 in FIG. 3, the compliant membrane 45 may have an excursion range as represented by dashed lines 45a, while an excursion range of a compliant membrane in a single ported microphone, or other microphone having a higher pressure differential, may be much larger.

It should further be understood that in other embodiments, an acoustic resistance or acoustic impedance of primary port 42 and secondary port 44 with respect to one another may be tuned by controlling a length of the pathway to the respective sides of the compliant membrane. For example, secondary port 44 may be associated with a channel feeding into the back side 48 of compliant membrane 45. In this aspect, the dimensions of the channel may be changed to control a resistance of the channel to an acoustic flow through the channel. For example, the channel could be made longer, or could be made narrower, to increase an acoustic resistance of acoustic impedance so that it is greater than that of primary port 42.

It should be understood, however, that in each embodiment, the magnitude of the acoustic pressure acting upon each side of the compliant membrane 45 can be controlled, or otherwise modified, by tuning or calibrating characteristics of the primary and secondary ports 42, 44 with respect to one another to achieve the desired results, as opposed to, for example, adding an acoustic material or changing an external pressure at the port itself. In other words, the microphone is to reside in a uniform pressure field (e.g., the back volume of the loudspeaker 25) and the ports themselves are specifically designed to, for example, control or modify a magnitude of net pressure gradient urging against the membrane 45 to within a desired range during all anticipated pressure levels.

In addition, the acoustic characteristics of the primary and secondary ports 42, 44 can be controlled in the absence of additional acoustic materials, for example, an acoustically resistive material such as a mesh, membrane or the like positioned over one or more of the ports. In this aspect, microphone M0 can be considered thermally stable, or more thermally stable in comparison to a microphone requiring an acoustically resistive material to modify the acoustic properties of one or more of the ports. In particular, it has been found that in some cases, the resistivity of an acoustic material may vary with temperature, and in turn, the performance of the device will also vary. Since microphone 45 does not require the use of an acoustically resistive material to control the sensitivity as previously discussed, the acoustic performance can remain consistent regardless of a temperature of the surrounding environment.

Figure 5:
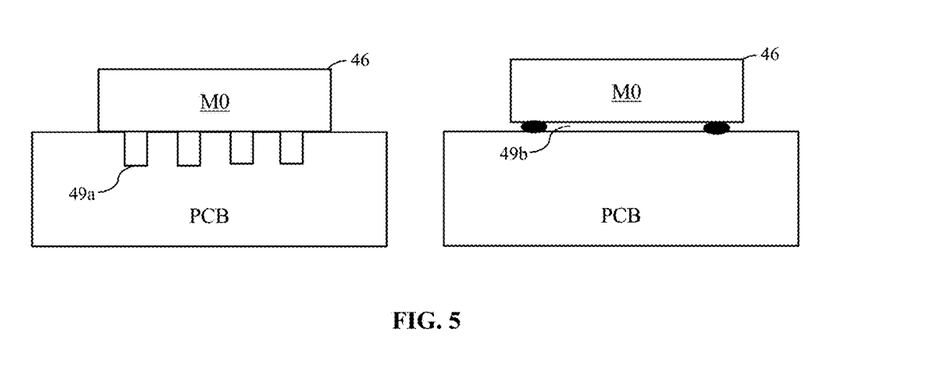
FIG. 5 illustrates an alternative example of a port configuration for a pressure differential microphone as shown in FIG. 3, as when mounted to a printed circuit board.

As described thus far, the second port and/or the primary port can define a single aperture through the wall of the enclosure 46. In some embodiments, one or both of primary port 42 and the secondary port 44 can be formed by a plurality of discrete apertures through the wall of the enclosure 46, as indicated by FIG. 5. A size of each discrete port 42A, 42B, 42C, 42D corresponding to, e.g., the primary port 42, can be selected to provide a desired aggregate surface area, size, acoustic resistance and/or acoustic impedance tuned with respect to the secondary 44, and vice-versa. It is noted that the use of multiple discrete ports may provide advantages from a manufacturing and microphone performance standpoint. For example, the plurality of discrete ports may allow for more fine tuning of the microphone sensitivity. In particular, for a single port with ±10% tolerance, a small change in the size of one hole with respect to the other makes a large difference in attenuation. Thus, by using discrete ports with a given manufacturability tolerance (e.g., ±10%) the standard deviation around the mean by a factor of √2 could be reduced every time the number of ports is doubled.

In some versions of a pressure-differential microphone as disclosed herein, a secondary port 44 (and/or a primary port 42) can be defined by one or more recessed regions 49a (FIG. 6) of a printed circuit board (PCB), rather than (or in addition to) an aperture through a wall of the enclosure 46. For example, the microphone enclosure 46 can be mounted to a printed circuit board PCB. A region of the enclosure 46 facing the printed circuit board can be wholly or partially opened in relation to a surface area of, e.g., the second major surface 48 of the membrane 45. The enclosure 46 can abut a major surface of the PCB and the PCB can define one or more recesses 49a, or grooves or slots, from the major surface of the PCB passing beneath the enclosure wall and defining one or more corresponding discrete ports 49a acoustically coupling the second major surface 48 of the membrane 45 with the rear chamber 25 of the loudspeaker.

Alternatively or additionally, a gap 49b (FIG. 6) can exist between the enclosure 46 and the printed circuit board (PCB), and that gap can define the entire secondary port 44 (or a portion thereof) acoustically coupling the second major surface 48 to the rear chamber 25 of the loudspeaker.

Although various characteristics of the secondary port 42 and secondary port 44 are specifically referred to herein, the primary port 42 may instead include any one or more of the acoustic characteristics referenced herein with respect to secondary port 44. In other words, the ports may be interchangeably referred to herein, with the most important characteristic being that they have different acoustic characteristics.

Figure 6:
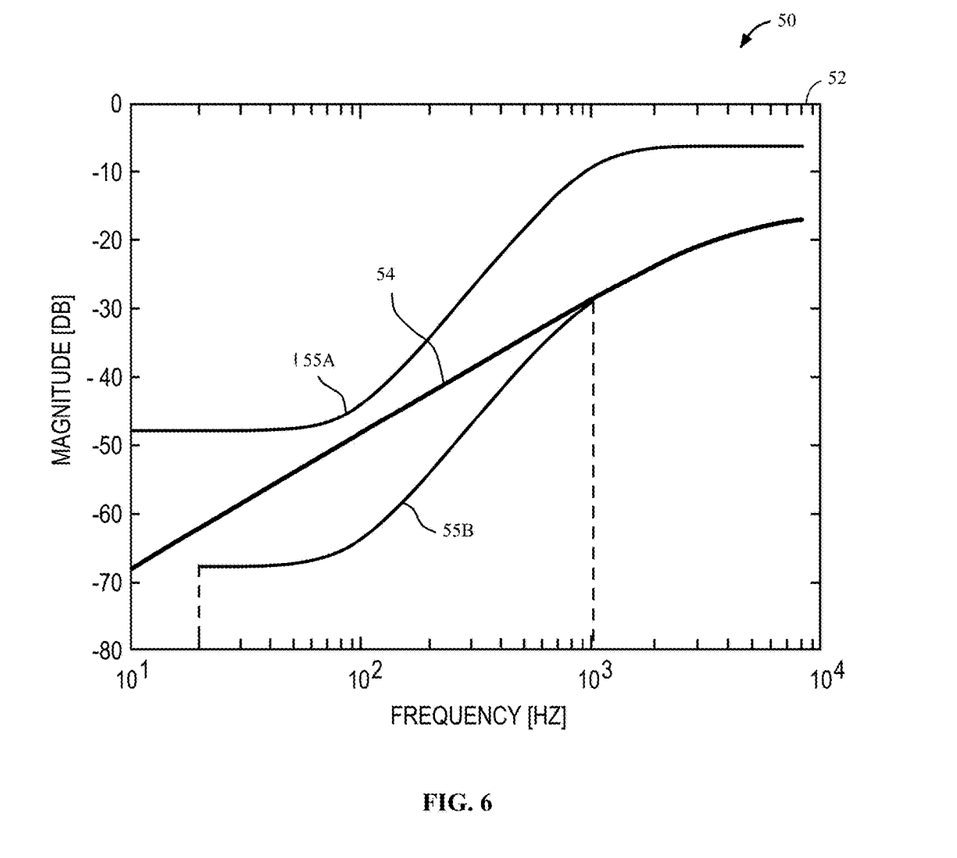
FIG. 6 illustrates a plot of frequency-dependent variation in microphone sensitivity to sound pressure level.

FIG. 6 shows a frequency response curve reflecting an example attenuation range of the differential pressure gradient microphone M0. In particular, graph 50 illustrates an attenuation range for maximum signal-to-noise ratio (SNR) in a particular application disclosed herein. From graph 50 it can be seen that a controlled amount of attenuation is achieved by tuning the primary and secondary ports of microphone M0 as discussed above. A degree of attenuation is illustrated with respect to the response of a reference microphone (e.g., single ported microphone) which is represented by a flat line 52 (at magnitude 0 dB), while a pressure gradient microphone having tuned acoustic ports as described herein is illustrated by the curve 54 and an example desired or target attenuation range is represented by the area between curves 55A, 55B, between which lies curve 54. The upwardly inclined nature of curve 54 shows that microphone M0 is relatively less sensitive at relatively low frequencies than at relatively higher frequencies.

For example, in one embodiment, a pressure gradient microphone may be attenuated within a range of about 45 dB to about 70 dB (for example 50 dB) at frequencies below 100 Hz, but within a range of about 5 dB to about 30 dB above 1 kHz, and gradually change therebetween. The magnitude of attenuation is therefore considered to increase as the frequency decreases (e.g., attenuation is higher within a low frequency range). For example, the degree of attenuation is greater at less than 0.1 kHz than between 0.1 kHz and 1 kHz. For example, in one embodiment, the ports are tuned to achieve between 10 dB to 30 dB attenuation of the microphone signal output at a high frequency (e.g., 1 kHz and above) and 45 dB to 70 dB attenuation of the microphone signal output at a low frequency (e.g., 0.1 kHz or less).

In addition to being able to control a level of attenuation by tuning one port with respect to another, attenuation can be controlled by varying a size of the secondary port alone.

It should further be understood that in addition to controlling the size of the secondary port, the attenuation may be further tuned, or otherwise controlled, by changing the volume of the enclosure of the MEMS microphone chamber or changing the acoustic characteristics of the primary port (e.g., making the port more or less acoustically resistive by adding a membrane for example that covers the opening of the port).

Assuming a sealed enclosure 20, at low frequencies having wavelengths significantly larger than the dimension of the enclosure, the sound field inside the enclosure 20 is a pressure field. Accordingly, observations by the internal microphone M0 can vary linearly with diaphragm displacement, and output from the microphone M0 can provide a useful reference signal to the AEC 30 for filtering the observed near-end signal 22.

VII. Computing Environments

Figure 7:
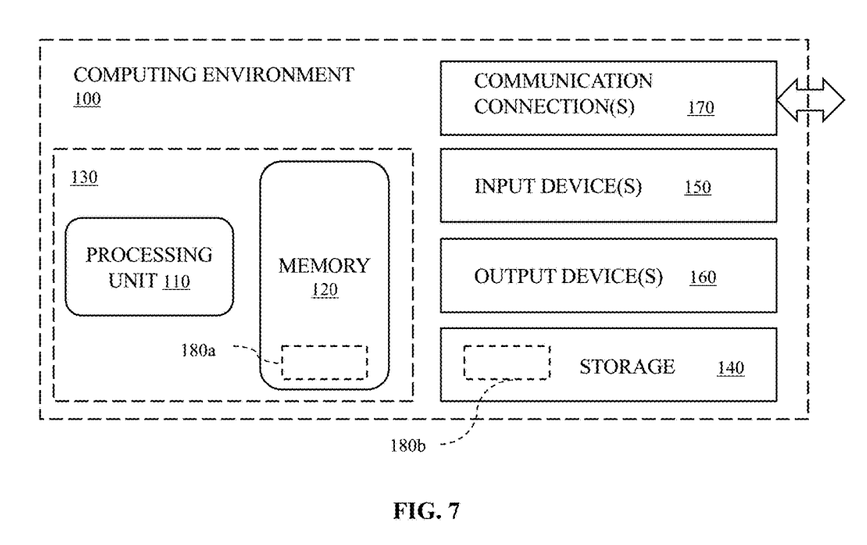
FIG. 7 shows a block diagram of a computing environment suitable for implementing disclosed methods.

FIG. 7 illustrates a generalized example of a suitable computing environment 100 in which described methods, embodiments, techniques, and technologies relating, for example, to filtering echo from an observed signal. The computing environment 100 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and handheld devices (e.g., a mobile-communications device, or, more particularly but not exclusively, IPHONE®/IPAD® devices, available from Apple Inc. of Cupertino, Calif.), multiprocessor systems, microprocessor-based or programmable consumer electronics, embedded platforms, network computers, minicomputers, mainframe computers, smartphones, tablet computers, data centers, audio devices, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 100 includes at least one central processing unit 110 and memory 120. In FIG. 7, this most basic configuration 130 is included within a dashed line. The central processing unit 110 executes computer-executable instructions and may be a real or a virtual processor. In a multi-processing system, multiple processing units execute computer-executable instructions to increase processing power and as such, multiple processors can run simultaneously. The memory 120 may be volatile memory (e.g., registers, cache, RAM), non-volatile memory (e.g., ROM, EEPROM, flash memory, etc.), or some combination of the two. The memory 120 stores software 180a that can, for example, implement one or more of the innovative technologies described herein, when executed by a processor.

A computing environment may have additional features. For example, the computing environment 100 includes storage 140, one or more input devices 150, one or more output devices 160, and one or more communication connections 170. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

The store 140 may be removable or non-removable, and can include selected forms of machine-readable media. In general machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 100. The storage 140 stores instructions for the software 180, which can implement technologies described herein.

The store 140 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

The input device(s) 150 may be a touch input device, such as a keyboard, keypad, mouse, pen, touchscreen, touch pad, or trackball, a voice input device, a scanning device, or another device, that provides input to the computing environment 100. For audio, the input device(s) 150 may include a microphone or other transducer (e.g., a sound card or similar device that accepts audio input in analog or digital form), or a computer-readable media reader that provides audio samples to the computing environment 100.

The output device(s) 160 may be a display, printer, speaker transducer, DVD-writer, or another device that provides output from the computing environment 100.

The communication connection(s) 170 enable communication over a communication medium (e.g., a connecting network) to another computing entity. The communication medium conveys information such as computer-executable instructions, compressed graphics information, processed signal information (including processed audio signals), or other data in a modulated data signal.

Thus, disclosed computing environments are suitable for performing disclosed orientation estimation and audio rendering processes as disclosed herein.

Machine-readable media are any available media that can be accessed within a computing environment 100. By way of example, and not limitation, with the computing environment 100, machine-readable media include memory 120, storage 140, communication media (not shown), and combinations of any of the above. Tangible machine-readable (or computer-readable) media exclude transitory signals.

As explained above, some disclosed principles can be embodied in a tangible, non-transitory machine-readable medium (such as microelectronic memory) having stored thereon instructions, which program one or more data processing components (generically referred to here as a "processor") to perform the digital signal processing operations described above including estimating, adapting (by the adaptive filter process blocks 240a, . . . ,240f), computing, calculating, measuring, adjusting (by the audio rendering processor 210), sensing, measuring, filtering, addition, subtraction, inversion, comparisons, and decision making (such as by the acoustic orientation estimator 255). In other embodiments, some of these operations (of a machine process) might be performed by specific electronic hardware components that contain hardwired logic (e.g., dedicated digital filter blocks). Those operations might alternatively be performed by any combination of programmed data processing components and fixed hardwired circuit components.

The audio device 10 can include a loudspeaker cabinet 12 configured to produce sound. The audio device 10 can also include a processor, and a non-transitory machine readable medium (memory) in which instructions are stored which when executed by the processor automatically perform an orientation detection process as described herein.

X. Other Embodiments

The examples described above generally concern apparatus, methods, and related systems to filter acoustic echo from an observed near-end audio signal, as can arise from playback of a far-end signal through a nearby loudspeaker. More particularly but not exclusively, disclosed principles pertain to using a reference signal linearly corresponding to the loudspeaker displacement, as such displacement can indicate linear and non-linear components in actually radiated sound. AEC using such a reference signal to filter an observed signal can filter non-linear components of echo that otherwise would be missed using conventional AEC processors. Nonetheless, embodiments other than those described above in detail are contemplated based on the principles disclosed herein, together with any attendant changes in configurations of the respective apparatus described herein.

For example, loudspeaker S0 is referred to herein as being associated with a reference microphone M0. However, any one or more of the loudspeaker transducers $S_0, S_1, \ldots S_6$ can have a corresponding reference microphone. Moreover, the AEC 30 can receive each respective signal output from the one or more reference microphones, and filter each respective reference signal, or a combination (e.g., a centrally tending combination, as a mean or a median, or a bandwise combination in which a signal emitted by a first reference microphone corresponds to a first frequency band, a signal emitted by a second reference microphone corresponds to a second frequency band, and so on), from the observed near-end signal 22. Such filtering can be applied over one or more frequency bands and/or over one or more delays. For example, a far-end signal can pass through a cross-over (not shown) to cause a given loudspeaker to radiate sound over a selected frequency band. Accordingly, the reference signal provided by the internal microphone associated with that loudspeaker can be filtered from the observed near-end signal 22 over a frequency band corresponding to the band radiated by the loudspeaker and/or harmonics thereof.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

The principles described above in connection with any particular example can be combined with the principles described in connection with another example described herein. Accordingly, this detailed description shall not be construed in a limiting sense, and following a review of this disclosure, those of ordinary skill in the art will appreciate the wide variety of signal processing and audio rendering techniques that can be devised using the various concepts described herein.

Moreover, those of ordinary skill in the art will appreciate that the exemplary embodiments disclosed herein can be adapted to various configurations and/or uses without departing from the disclosed principles. Applying the principles disclosed herein, it is possible to provide a wide variety of systems adapted to generating an artificial terrain map. For example, modules identified as constituting a portion of a given computational engine in the above description or in the drawings can be partitioned differently than described herein, distributed among one or more modules, or omitted altogether. As well, such modules can be implemented as a portion of a different computational engine without departing from some disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the features and method acts of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve to the right to claim any and all combinations of features and technologies described herein as understood by a person of ordinary skill in the art, including, for example, all that comes within the scope and spirit of the following claims.

We claim:

1. An audio system, comprising:
   a loudspeaker transducer and a corresponding enclosure defining an acoustic chamber, an external microphone to receive a near-end audio content and an internal pressure-gradient microphone positioned in the acoustic chamber to detect a radiated output from the loudspeaker transducer; and
   a processor and a memory containing instructions that, when executed by the processor, cause the audio system to
      receive, by a filter, a first reference signal from the internal microphone,
      receive, by a combiner, a near-end signal from the external microphone,
      receive, by the filter, a second reference signal corresponding to a far-end signal,
      determine a clean version of the near-end signal by removing echo from the near-end signal in correspondence with the first reference signal and the second reference signal, and
      emit the clean version of the near-end signal.

2. The audio system according to claim 1, wherein the pressure-gradient microphone has a diaphragm separating opposed first and second chambers, wherein a first port couples the first chamber to the acoustic chamber and a second port couples the second chamber to the acoustic chamber, wherein an open area of the first port differs from an open area of the second port.

3. The audio system according to claim 2, wherein the internal microphone has an enclosure mounted to a printed circuit board, and wherein the first port, the second port, or both is at least partially defined by one or more recesses in the printed circuit board and/or a gap between the enclosure and the printed circuit board.

4. The audio system according to claim 2, wherein the first port comprises a plurality of first ports and/or the second port comprises a plurality of second ports, wherein the open area of the first port comprises an aggregate open area of the first ports and/or the open area of the second port comprises an aggregate open area of the second ports.

5. The audio system according to claim 1, wherein the internal pressure-gradient microphone attenuates sound-pressure level by between about 45 dB and about 70 dB at frequencies below about 100 Hz, and between about 5 dB and about 30 dB at frequencies above about 1 kHz.

6. The audio system according to claim 1, wherein loudspeaker transducer comprises a movable diaphragm and the instructions, when executed by the processor, further cause the audio system to determine a velocity of the diaphragm from an output of the internal microphone.

7. The audio system according to claim 6, wherein the instructions, when executed by the processor, further cause the audio system to determine the first reference signal at least in part from the determined velocity of the diaphragm.

8. The audio system according to claim 1, wherein the first reference signal corresponds to a first frequency band and the second reference signal corresponds to a second frequency band, and wherein the instructions, when executed by the processor, further cause the audio device to determine a clean version of the near-end signal by removing echo from the near-end signal in correspondence with a band-wise combination of the first reference signal over the first frequency band with the second reference signal over the second frequency band.

9. The audio system according to claim 1, wherein the second reference signal comprises one or more of a far-end signal to be rendered by the loudspeaker transducer, an output from a secondary voice coil, an output from a capacitive displacement sensor, and an output from a laser displacement sensor.

10. The audio system according to claim 1, wherein the external microphone comprises a first external microphone and the near-end signal comprises a first near-end signal corresponding to the first external microphone, wherein the audio system further comprises at least one other external microphone and the instructions, when executed by the processor, further cause the audio system to receive a further near-end signal from each respective other external microphone and to determine a clean version of each further near-end signal by removing echo from the respective near-end signal in correspondence with at least the first reference signal.

11. The audio system according to claim 1, wherein the loudspeaker transducer comprises a first loudspeaker transducer, the acoustic chamber comprises a first acoustic chamber, and the internal pressure-gradient microphone comprises a first internal microphone, the audio system further comprising:
at least one other loudspeaker transducer;
a respective acoustic chamber corresponding to each at least one other loudspeaker transducer; and
a corresponding internal microphone positioned in each respective acoustic chamber corresponding to each at least one other loudspeaker transducer.

12. The audio system according to claim 11, wherein the instructions, when executed by the processor, further cause the audio system to receive a respective reference signal from each internal pressure-gradient microphone and wherein the second reference signal comprises the reference signal received from the internal microphone corresponding to a respective one of the at least one other loudspeaker transducer.

13. A method of removing echo from a near-end signal, the method comprising:
radiating sound from a loudspeaker transducer in correspondence with a far-end signal, wherein the loudspeaker transducer has an enclosure defining an acoustic chamber;
receiving, by a combiner, a near-end signal from an external microphone, wherein the near-end signal contains an intended near-end content and an impairment content, wherein the impairment content corresponds to the sound radiated by the loudspeaker transducer;
receiving, by a filter, a first reference signal from an internal pressure-gradient microphone positioned in the acoustic chamber to estimate the sound radiated by the loudspeaker transducer;
receiving, by the filter, a second reference signal corresponding to the far-end signal;
removing an estimate of the impairment content from the near-end signal in correspondence with a combination of the first reference signal and the second reference signal from the near-end signal to define a clean version of the near-end signal, and
emitting the clean version of the near-end signal.

14. The method according to claim 13, wherein the loudspeaker has a movable diaphragm and the act of receiving the first reference signal comprises determining a velocity of the movable diaphragm.

15. An article of manufacture, comprising a tangible, non-transitory computer readable media containing instructions, that, when executed by a processor of an audio system having a loudspeaker and a corresponding enclosure, an external microphone and an internal pressure-gradient microphone positioned in the enclosure to detect a parameter indicative of a radiated output from the loudspeaker, cause the audio system to
radiate sound from the loudspeaker transducer;
receive, by a combiner, a near-end signal from the external microphone, wherein the near-end signal contains an intended near-end content and an impairment content corresponding to the sound radiated by the loudspeaker transducer;
receive, by a filter, a first reference signal from the internal pressure-gradient microphone;
receive, by the filter, a second reference signal corresponding to the radiated sound;
remove an estimate of the impairment content from the near-end signal based on a combination of the first reference signal and the second reference signal to define a clean version of the near-end signal, and
emit the clean near-end signal.

16. The article according to claim 15, wherein the loudspeaker has a movable diaphragm, the parameter indicative of a radiated sound comprises a pressure indicative of a velocity of the diaphragm, and the instructions, when executed by the processor, further cause the audio system to determine a velocity of the movable diaphragm from the reference signal received from the internal pressure-gradient microphone.

17. The article according to claim 15, wherein the first reference signal corresponds to a first frequency band and the second reference signal corresponds to a second frequency band, and the combination of the first and the second references signals comprises a band-wise combination to filter the first reference signal from the near-end signal over the first frequency band and to filter the second reference signal from the near-end signal over the second frequency band.

18. The audio system according to claim 11, wherein the instructions, when executed by the processor, further cause the audio system to receive a respective reference signal from each internal pressure-gradient microphone and to determine the clean version of the near-end signal by removing echo in correspondence with a combination of the first reference signal, the second reference signal, and the reference signal from the internal pressure-gradient microphone corresponding to a respective one of the at least one other loudspeaker transducer.

* * * * *